US012766409B2

(12) United States Patent
Sun et al.

(10) Patent No.: US 12,766,409 B2
(45) Date of Patent: Oct. 20, 2026

(54) METHOD AND APPARATUS FOR SWITCHING PICTURES IN GAME, ELECTRONIC DEVICE, AND STORAGE MEDIUM

(71) Applicant: NETEASE (HANGZHOU) NETWORK CO., LTD., Hangzhou (CN)

(72) Inventors: Mengting Sun, Hangzhou (CN); Hongbo Shi, Hangzhou (CN); Yufei Xie, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 149 days.

(21) Appl. No.: 18/695,016

(22) PCT Filed: Apr. 18, 2022

(86) PCT No.: PCT/CN2022/087469
§ 371 (c)(1),
(2) Date: Mar. 25, 2024

(87) PCT Pub. No.: WO2023/123750
PCT Pub. Date: Jul. 6, 2023

(65) Prior Publication Data

US 2024/0390790 A1 Nov. 28, 2024

(30) Foreign Application Priority Data

Dec. 31, 2021 (CN) ........................ 202111676610.X

(51) Int. Cl.
*A63F 13/52* (2014.01)
*A63F 13/2145* (2014.01)
*A63F 13/533* (2014.01)

(52) U.S. Cl.
CPC ........... *A63F 13/52* (2014.09); *A63F 13/533* (2014.09); *A63F 13/2145* (2014.09)

(58) Field of Classification Search
CPC .... A63F 13/52; A63F 13/533; A63F 13/2145; G06F 3/04847; G06F 3/0485
See application file for complete search history.

(56) References Cited

U.S. PATENT DOCUMENTS

2018/0353858 A1* 12/2018 Kanemori ........... A63F 13/2145
2019/0091570 A1 3/2019 Wang et al.

(Continued)

FOREIGN PATENT DOCUMENTS

CN 108920084 A 11/2018
CN 109701272 A 5/2019

(Continued)

OTHER PUBLICATIONS

International Search Report dated Sep. 16, 2022 of International Application No. PCT/CN2022/087469.

(Continued)

*Primary Examiner* — Dmitry Suhol
*Assistant Examiner* — Julie Grace Dosher
(74) *Attorney, Agent, or Firm* — Qinghong Xu

(57) ABSTRACT

The present disclosure provides method and device for switching pictures in game, an electronic device, and a storage medium. The method includes obtaining, in response to receiving a sliding operation, a touch parameter corresponding to the sliding operation; if the touch parameter meets a judgment condition for fling, determining buffering adjustment information of visual field, performing buffering adjustment of switching of the visual field for a current visual field picture of the game to display a target visual field picture of the game in the graphical user interface, and performing a game interactive operation; if the touch param- (Continued)

eter meets a judgment condition for adjustment of the visual field, determining compensating adjustment information of the visual field, and performing compensating adjustment of switching of the visual field for the current visual field picture of the game to display the target visual field picture of the game in the graphical user interface.

20 Claims, 8 Drawing Sheets

(56) References Cited

U.S. PATENT DOCUMENTS

| | | | |
|---|---|---|---|
| 2019/0299091 | A1 | 10/2019 | Wu et al. |
| 2020/0368616 | A1 | 11/2020 | Delamont |

FOREIGN PATENT DOCUMENTS

| | | | | |
|---|---|---|---|---|
| CN | 110339556 | A | | 10/2019 |
| CN | 110448906 | A | | 11/2019 |
| CN | 112604281 | A | | 4/2021 |
| CN | 112619137 | A | | 4/2021 |
| CN | 112791410 | A | | 5/2021 |
| CN | 114356193 | A | | 4/2022 |
| JP | 2017148481 | A | * | 8/2017 |
| JP | 2018020126 | A | | 2/2018 |
| JP | 2022074309 | A | * | 5/2022 |

OTHER PUBLICATIONS

1st Office Action dated May 7, 2023 of Chinese Application No. 202111676610.X.

Notice of Allowance dated Jun. 13, 2023 of Chinese Application No. 202111676610.X.

* cited by examiner

METHOD AND APPARATUS FOR SWITCHING PICTURES IN GAME, ELECTRONIC DEVICE, AND STORAGE MEDIUM

CROSS CORRELATION OF RELATED APPLICATION

This application is a U.S. National Stage of International Application No. PCT/CN2022/087469, filed on Apr. 18, 2022, which claims the benefit of priority to the Chinese Application No. 202111676610. X, filed on Dec. 31, 2021, both of which are incorporated herein by reference in their entireties for all purpose.

TECHNICAL FIELD

The present disclosure relates to the field of gaming technology, particularly to a method for switching pictures in game, a device for switching pictures in game, an electronic device, and a computer-readable storage medium.

BACKGROUND

In the 3D top-down view of mobile game scene, the virtual camera movement of the mobile game is achieved through operations such as pressing, dragging, and releasing by the fingers of the players on the scene. The basic logic of virtual camera movement is to make the touch point position of the player's fingers on the mobile phone screen correspond to the scene position. The player performs an intuitive virtual camera change operation by moving his/her finger and dragging the scene, achieving control of the visual field. In some games, sometimes a visual field control joystick (an interactive control displayed on the screen, or an interactive area not displayed on the screen, etc.) is used to compound the fling gesture. If the fling gesture is executed while performing the A operation (visual field control), it can immediately switch to the B operation corresponding to the fling gesture.

SUMMARY

The embodiments of the present disclosure provide a method for switching pictures in a game, wherein a graphical user interface is provided through a preset terminal, content displayed in the graphical user interface at least includes a visual field picture of the game and a visual field switching area for the visual field picture of the game, and the method includes: obtaining, in response to receiving a sliding operation in the visual field switching area, a touch parameter corresponding to the sliding operation; if the touch parameter meets a judgment condition for fling, determining buffering adjustment information of visual field corresponding to the sliding operation, performing buffering adjustment of switching of the visual field for a current visual field picture of the game based on the buffering adjustment information of the visual field to display a target visual field picture of the game in the graphical user interface, and performing a game interactive operation corresponding to the sliding operation; if the touch parameter meets a judgment condition for adjustment of the visual field, determining compensating adjustment information of the visual field corresponding to the sliding operation, and performing compensating adjustment of switching of the visual field for the current visual field picture of the game based on the compensating adjustment information of the visual field to display the target visual field picture of the game in the graphical user interface.

The embodiments of the present disclosure provide a device for switching pictures in a game, where a graphical user interface is provided through a preset terminal, content displayed in the graphical user interface at least includes a visual field picture of the game and a visual field switching area for the visual field picture of the game, and the device includes: a touch parameter obtaining module configured to obtain, in response to receiving a sliding operation in the visual field switching area, a touch parameter corresponding to the sliding operation; a first visual field picture switching module configured to determine buffering adjustment information of visual field corresponding to the sliding operation if the touch parameter meets the judgment condition for fling, perform buffering adjustment of switching of the visual field for a current visual field picture of the game based on the buffer adjustment information of the visual field to display a target visual field picture of the game in the graphical user interface, and perform a game interactive operation corresponding to the sliding operation; a second visual field picture switching module configured to determine compensating adjustment information of the visual field corresponding to the sliding operation if the touch parameter meets a judgment condition for adjustment of the visual field, and perform compensating adjustment of switching of the visual field for the current visual field picture of the game based on the compensating adjustment information of the visual field to display the target visual field picture of the game in the graphical user interface.

The embodiments of the present disclosure also provide an electronic device including a processor, a communication interface, a memory, and a communication bus, wherein the processor, the communication interface, and the memory communicate with each other through the communication bus; the memory is configured to store computer programs; the processor is configured to implement the method described above when executing programs stored in the memory.

The embodiments of the present disclosure also provide a computer-readable storage medium storing instructions that, when executed by one or more processors, cause the processors to execute the method described above.

DETAILED DESCRIPTION

In order to make the above objectives, features, and advantages of the present disclosure more obvious and understandable, further detailed explanations will be provided below in conjunction with the accompanying drawings and specific embodiments.

As an example, in some games, sometimes a visual field control joystick (an interactive control displayed on the screen or an interactive area not displayed on the screen, etc.) is used to compound the fling gesture. If the fling gesture is executed while performing the A operation (visual field control), it can immediately switch to the B operation corresponding to the fling gesture. For the judgment of the fling gesture, a response can be triggered when the layer is slid at a faster speed than the system assigned default speed and ends with a finger lift behavior. Due to the fact that the judgment point of the fling gesture lies in the moment when the finger is lifted, the visual field movement generated by the high-speed movement during the period from the start of the fling to the lifting of the finger does not meet the user's expectations, which can easily cause significant visual interference to the player and result in a poor visual experience.

Figure 1:
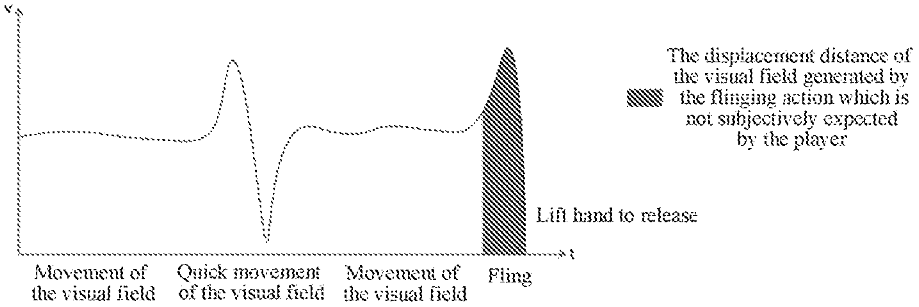
FIG. 1 is a schematic diagram of the displacement distance of the visual field provided in the embodiment of the present disclosure.

For sliding operations, they can be classified into drag, swipe, and fling based on the gesture rates of the sliding operations. Drag can be a precise gesture, with slower sliding speed and more precise sliding path. Drag can usually be an operation aimed at a specific target displayed in the graphical user interface. Swipe can be a rough gesture, with a quick sliding speed and usually without a specific screen target. Fling, which can be a rough gesture accompanied by finger lifting, has a quick sliding speed, and usually does not have a specific screen target. Due to the fact that the judgment point of the fling gesture lies in the moment when the finger is lifted, the visual field movement generated by the high-speed movement during the period from the start of the fling to the lifting of the finger will cause significant game picture jitter, and this can cause visual interference to the player. Referring to FIG. 1, it is a schematic diagram of the displacement distance of the visual field provided in the embodiment of the present disclosure. The horizontal axis can represent the sliding time of the sliding operation; the vertical axis can represent the movement speed of the visual field; and the product of the two represents the displacement of the visual field corresponding to the sliding operation (i.e. the area enclosed by the curve and coordinate axis). In FIG. 1, it shows v-t changes of three behaviors of regular movement of the visual field, fast movement of the visual field and flinging operation of the player. There is similar performance between the fast movement of the visual field and the flinging operation. In both of the fast movement of the visual field and the flinging operation, the acceleration is increased to a higher value in a short period of time. The flinging operation lasts for a short time and ends with raising the hand. The position and time of the fast movement of the visual field are uncertain, usually accompanied by movement stagnation after a rapid increase in acceleration, and hand lifting behavior may not necessarily occur. In FIG. 1, the gray area represents the movement distance of the visual field generated by the flinging operation that is not within the player's expectation. Due to the high speed of the visual field movement within a short period of time, although the time is extremely short, the resulting visual field movement distance is also relatively large, which will cause significant visual interference. From this, it can be seen that in related games, composite joysticks or composite operation areas are often applied in the y-axis direction without regulating the visual field of the game, and it is difficult to apply them to the x-axis. However, for composite joysticks/composite operation areas that are applied to the x-axis or can regulate the visual field of game, the interference of the visual field caused by flinging operations will seriously affect the gaming experience of the player.

The embodiments of the present disclosure provide a method and a device for switching pictures in a game, an electronic device and a computer readable storage medium, in order to solve or partially solve the problem of visual interference for the players caused by movement of the visual field which is not subjectively expected by the player due to the user operation during the game.

One of the core inventive points in the embodiment of the present disclosure is that when a sliding operation is received in the visual field switching area, the terminal can obtain the sliding parameter of the sliding operation and corresponding operation judgment condition. Then, based on the operation judgment condition and the sliding parameter, the sliding operation is judged to determine whether it is a flinging operation or a conventional sliding operation. Then, according to the type of operation of the sliding operation, when switching the visual field, visual field control is performed to reduce the visual field movement that is not subjectively expected by the player during game operations. Specifically, the terminal can display the game visual field picture and corresponding visual field switching area of the game through the graphical user interface. In the game, the terminal can obtain, in response to receiving a sliding operation in the visual field switching area, the touch parameter corresponding to the sliding operation. If the touch parameter meets the judgment condition for fling, the corresponding buffering adjustment information of the visual field is determined, and then the buffering adjustment of the visual field switching is carried out based on the buffering adjustment information of the visual field, in order to display the target visual field picture of the game in the graphical user interface and perform the game interactive operation corresponding to the sliding operation. If the touch parameter meets the judgment condition for visual field adjustment, the corresponding compensating adjustment information of the visual field is determined, and the compensating adjustment for the visual field switching is carried out based on the compensating adjustment information of the visual field, in order to display the target visual field picture of the game in the graphical user interface.

Figure 2:
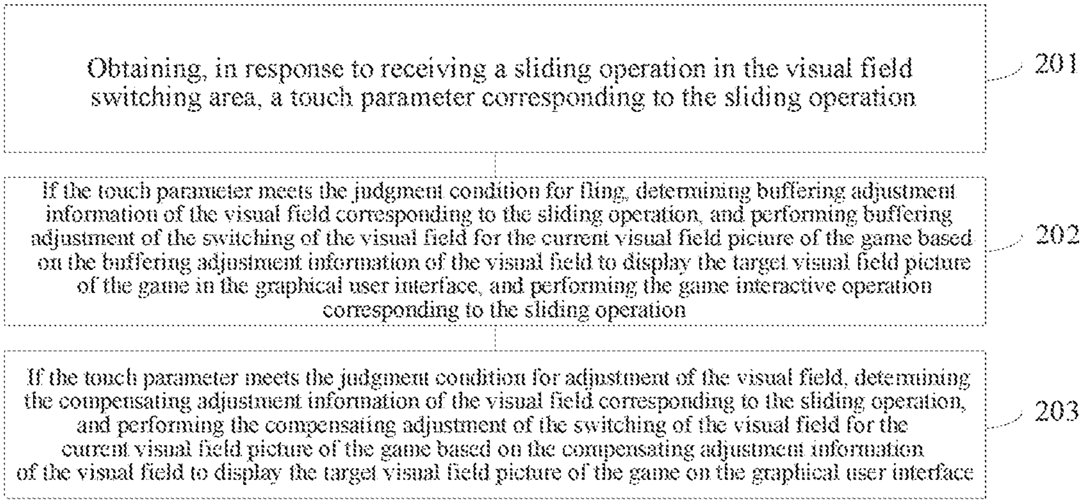
FIG. 2 is a flowchart of steps of a method for switching pictures in game provided in the embodiment of the present disclosure.

Referring to FIG. 2, a flowchart of steps of a method for switching pictures in game provided in the embodiment of the present disclosure is shown. A graphical user interface is provided through a preset terminal, and the content displayed in the graphical user interface at least includes a visual field picture of the game and a visual field switching area for the visual field picture of the game. The method may include the following steps.

Step 201, obtaining, in response to receiving a sliding operation in the visual field switching area, a touch parameter corresponding to the sliding operation.

In some embodiments, the embodiment of the present disclosure can be applied to a user terminal with touch functions, such as a mobile phone, a tablet, etc. The user terminal can run a corresponding game application and the visual field picture of the game and interactive controls corresponding to the game application can be displayed through the graphical user interface of the terminal, so that players can perform corresponding game operations through the interactive controls.

Figure 3:
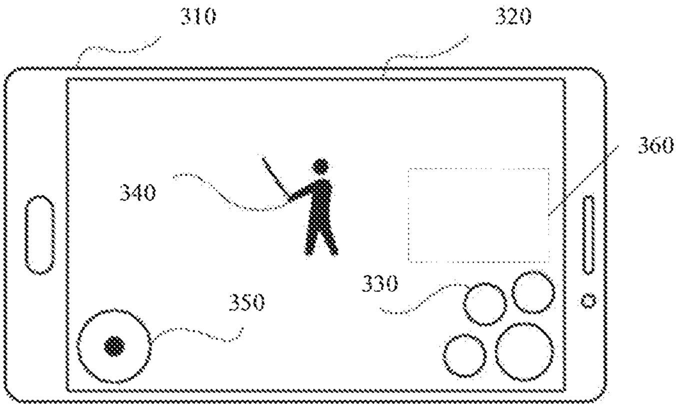
FIG. 3 is a schematic diagram of the graphical user interface provided in the embodiment of the present disclosure.

Referring to FIG. 3, a schematic diagram of the graphical user interface provided in the present disclosure embodiment is shown. The graphical user interface 320 can be obtained by executing software applications on the processor of the mobile terminal 310 and rendering them on the touch display of the mobile terminal 310. The graphical user interface 320 may include at least one operation control 330, and may also include a virtual object 340 and a mobile controller 350. In specific implementation, the mobile controller 350 can be located at the lower left corner of the graphical user interface 320, in order to control the displacement and/or rotation of the game character 340 in the game scene based on the operations received by the mobile controller 350, while multiple operation controls 330 are provided at the lower right corner of the graphical user interface 320 to provide players with different control operations. Moreover, a corresponding visual field switching area 360 can be set on the right side of the graphical user interface 320. Players can switch the visual field picture of the game displayed in the graphical user interface 320 by entering the corresponding sliding operation in the visual field switching area 360. In some embodiments, forthe switching of the game visual field picture in the game, it can be done through the visual field switching area. Or, the visual field switching control can be displayed in the graphical user interface. Players can switch the visual field picture of the game through the visual field switching control, etc. The present disclosure is not limited to this.

In specific implementation the content displayed by the terminal in the graphical user interface can include the game scene and player characters located in the game scene. When the game is displayed in a first-person perspective, the visual field picture of the game obtained by capturing the game scene under the first-person perspective of the player character can be displayed in the graphical user interface. The visual field picture of the game includes the game scene within the visible range for the current orientation of the player character as well as parts of the player character (such as displaying only hands). Players can input corresponding sliding operations to control the orientation of the player character, in order to switch the visual field picture of the game. When the game is displayed in a third-person perspective, a visual field picture of the game obtained by capturing the game scene based on a virtual camera corresponding to the player character can be displayed in the graphical user interface. The visual field picture of the game can include the player character and the game scene within the visible range around the player character. Players can input corresponding sliding operations, turn the virtual camera to switch the visual field picture of the game, etc.

It should be noted that in the embodiment of the present disclosure, the visual field switching area located on the right side of the game interface is used as an example for illustration. It can be understood that a visual field switching control located on the right side of the game interface can also be used, or a visual field switching area or visual field switching control located on the left side can also be used. Specifically, in the game, players can input a sliding operation for the visual field switching area to switch the visual field picture of the game. After receiving the sliding operation for the visual field switching area, the terminal can obtain the sliding parameter corresponding to the sliding operation and the operation judgment conditions for the sliding operation. The sliding parameter can include sliding acceleration and sliding speed, etc. The operation judgment conditions can include the judgment condition for fling and the judgment condition for the visual field adjustment. The judgment condition for fling can be used to determine whether the sliding operation is a flinging operation, which can receive the sliding operation and determine whether the sliding acceleration of the sliding operation is greater than an acceleration threshold, and whether a touch lifting of the sliding operation is detected within the preset duration (if lifting is detected, then respond). The judgment condition for visual field adjustment can be used to determine whether the sliding operation is a conventional sliding operation (including ordinary sliding operation with sliding acceleration less than the acceleration threshold and quick sliding operation with sliding acceleration greater than or equal to the acceleration threshold), which can receive the sliding operation and determine whether the sliding acceleration of the sliding operation is greater than the acceleration threshold, and whether the touch lifting of the sliding operation is detected within the preset duration (if lifting is not detected, then respond).

Step 202, if the touch parameter meets the judgment condition for fling, determining buffering adjustment information of the visual field corresponding to the sliding operation, and performing buffering adjustment of the switching of the visual field for the current visual field picture of the game based on the buffering adjustment information of the visual field to display the target visual field picture of the game in the graphical user interface, and performing the game interactive operation corresponding to the sliding operation.

In the embodiment of the present disclosure, after obtaining the sliding parameter of the sliding operation for the visual field switching area, if the terminal detects that the sliding parameter meets the judgment condition for fling, it can be determined that the sliding operation corresponds to a sliding operation with composite function control. The sliding operation with composite function control can include sliding operation and game function triggering operation. That is, when the terminal performs the sliding operation, it can perform the sliding operation, and at the same time it can perform game interactive operation triggered by the sliding operation.

Specifically, the terminal can first determine the buffering adjustment information of the visual field corresponding to the sliding operation, and then perform buffering adjustment of the current visual field picture of the game based on the buffering adjustment information of the visual field, in order to display the target visual field picture of the game in the graphical user interface while performing the game interactive operation corresponding to the sliding operation. Therefore, when determining that the operation type of the sliding operation is fling, by determining the buffering adjustment information of the visual field corresponding to the flinging operation, when performing the visual field picture switching, the buffering of the visual field is performed based on the buffering adjustment information of the visual field, thereby reducing unexpected visual field movement generated by the flinging operation, reducing visual interference for players caused by the visual field picture switching, and ensuring the gaming experience of players. The buffering adjustment information of the visual field can be information for reducing the movement of the visual field picture during the sliding operation of the terminal, thereby reducing or avoiding the movement of the visual field picture by performing buffering adjustment for the larger movement of the visual field picture caused by the flinging operation based on the buffering adjustment information of the visual field.

In the specific implementation, for the judgment of the flinging operation, if the sliding acceleration of the sliding operation is greater than or equal to an acceleration threshold, the corresponding starting time point when the sliding acceleration of the sliding operation is greater than or equal to the acceleration threshold is obtained. Within the preset time from the starting time point, in response to the lifting operation of the sliding operation, the sliding operation is determined as a sliding operation. When the sliding operation for the visual field switching area is a sliding operation (flinging operation), the terminal can obtain the actual movement speed of the visual field corresponding to the sliding speed, as well as the buffering adjustment parameter corresponding to the judgment condition for fling. Based on the actual movement speed of the visual field and the buffering adjustment parameter, a first displacement of the visual field corresponding to the sliding operation can be determined. Then, according to the first displacement of the visual field, the buffering adjustment of the visual field switching is performed for the current visual field picture of the game, in order to display the target visual field picture of the game in the graphical user interface.

The acceleration threshold can be a threshold used to determine whether the sliding operation is a flinging operation, and the preset duration can be a time value used to determine whether the sliding operation is a flinging operation (due to the quick sliding speed of the flinging operation and the response point of lifting, the numerical value of this time value is small). Therefore, when the player inputs a sliding operation for the visual field switching area, the terminal can monitor the sliding acceleration of the sliding operation in real time. When the sliding acceleration at a certain moment is detected to be greater than or equal to the acceleration threshold corresponding to the judgment condition for fling, the time point corresponding to this moment is used as the judgment point. If the touch lift of the sliding operation is detected within the preset time from that time point, the sliding operation during the period from the judgment point to the touch lift is judged as a flinging operation. That is, during the process of switching the visual field by the player, another game interactive operation is triggered through quick sliding. For example, if the judgment point for the sliding operation is t and the preset duration is T1, then when the terminal detects the touch lifting of the sliding operation between t and (t+t1), it is determined that the type of sliding operation is a flinging operation, and the triggering behavior is a sliding operation.

After determining that the triggering behavior of the sliding operation is a sliding operation, on the one hand, the terminal can perform buffering adjustment of the visual field switching based on the sliding parameter corresponding to the sliding operation, and on the other hand, the terminal can determine the game interactive operation corresponding to the sliding operation, so as to execute the corresponding game interactive operation while switching the visual field picture of the game. Specifically, for the buffering adjustment of the visual field switching, the terminal can obtain the actual movement speed of the visual field corresponding to the sliding speed, as well as the buffering adjustment parameter corresponding to the judgment condition for fling. Then, buffering adjustment is performed for the actual movement speed of the visual field by adopting the buffering adjustment parameter, to obtain the target movement speed of the visual field corresponding to the sliding operation. Then, the first displacement of the visual field corresponding to the sliding operation is calculated by adopting the preset duration or actual operation duration and the target movement speed of the visual field. Then, buffering adjustment of the visual field switching is performed for the current visual field picture of the game according to the first displacement of the visual field, to display the target visual field picture of the game in the graphical user interface. The actual operation duration can be duration from the starting time point to the terminal responding to the lifting operation. For the flinging operation, in one case, if the sliding duration is exactly equal to the preset duration of the judgment condition for fling, the terminal can use the preset duration and the adjusted first movement speed of the visual field to calculate the displacement of the visual field. In another case, if the sliding duration is less than the preset duration of the judgment condition for fling, the terminal use the actual operation duration of the sliding operation and the adjusted first movement speed of the visual field to calculate the displacement of the visual field. Therefore, during the visual field switching process, it can be adjusted according to the actual operating situation, improving the flexibility of visual field switching.

In addition, the graphical user interface can include several interactive controls. For the game interactive operation of sliding operation, the terminal can first determine the target interactive control corresponding to the sliding operation, and then perform the game interactive operation corresponding to the target interactive control.

In some embodiments, for the movement speed of the visual field, the mapping relationship between the sliding speed and the movement speed of the visual field can be preset in the game, so that the terminal can determine the movement speed of the visual field based on the sliding speed of the sliding operation and the preset mapping relationship. The present disclosure is not limited to this.

In the specific implementation, for the displacement of the visual field generated by the flinging operation, the displacement of the visual field is relatively large without buffering adjustment, and the terminal will make significant changes of the displacement of the visual field to the current visual field picture of the game in the graphical user interface. In this regard, when performing the visual field picture switching generated by the flinging operation, the terminal can re-determine the displacement of the visual field, and achieve the buffering adjustment of the visual field picture switching by using the re-determined first displacement of the visual field as the displacement of the visual field generated by the flinging operation, to reduce or avoid the switching of the visual field picture that is not subjectively expected by the player caused by the flinging operation.

In one example, assuming that the acceleration threshold corresponding to the judgment condition for fling is a', the preset duration is t1, and the buffering adjustment parameter is c1, then the terminal can obtain the sliding speed v and the sliding acceleration a of the sliding operation after receiving the sliding operation for the visual field switching area. When $a \geq a'$, the starting time point that satisfies a' is used as the judgment point, and the time point t of the judgment point is obtained. If the touch lift of the sliding operation is detected between t and (t+t1), it is determined that the operation type of the sliding operation is a flinging operation, and the triggering behavior is a sliding operation. For the buffering adjustment of visual field picture switching, the actual movement speed of the visual field Va corresponding to the sliding speed v can be determined first (Va can represent the actual movement speed of the visual field picture without buffering adjustment of the visual field switching). Then, Va and buffering adjustment parameter c1 are used to calculate the target movement speed V1 of the visual field, and V1 is multiplied by t1 to obtain the displacement of the visual field of the visual field picture of the game from t to (t−t1). Then, the terminal can switch the current visual field picture of the game to the target visual field picture of the game based on the first displacement of the visual field during the period between t and (t+t1), thereby achieving buffering adjustment of the visual field picture switching by re-determining the displacement of the visual field, and reducing or avoiding the switching of the visual field picture that is not subjectively expected by the player caused by the flinging operations. In addition, the terminal can also perform game interactive operations corresponding to sliding operations while switching the visual field picture of the game. For example, if a player triggers a player character to squat down through a flinging operation while switching the visual field, the terminal can control the player character to squat down while switching the visual field picture of the game.

Step 203, if the touch parameter meets the judgment condition for adjustment of the visual field, determining the compensating adjustment information of the visual field corresponding to the sliding operation, and performing the compensating adjustment of the switching of the visual field for the current visual field picture of the game based on the compensating adjustment information of the visual field to display the target visual field picture of the game in the graphical user interface.

In the embodiment of the present disclosure, after obtaining the sliding parameter for the sliding operation in the visual field switching area, if the terminal detects that the sliding parameter meets the judgment condition for the adjustment of the visual field, it can be determined that the sliding operation is a sliding operation of non-flinging operation (specifically a quick sliding operation). That is, the sliding operation for the visual field switching area is a simple quick sliding operation, and the terminal can perform the visual field picture switching of the game corresponding to the sliding operation.

For the compensating adjustment information of the visual field, since the sliding accelerations are similar between the sliding operation corresponding to the quick movement of the visual field and the flinging operation, in the adjustment process of the visual field displacement, it can be assumed that the sliding operation corresponding to the quick movement of the visual field is a flinging operation, but the difference is that the sliding operation corresponding to the quick movement of the visual field does not have touch lifting. For this, the terminal will first perform buffering adjustment of the visual field switching for the quick movement of the visual field (the relevant process can be referred to in the previous description). If this part of the visual field displacement which is subjected to buffering adjustment to be reduced is not compensated for, there will be a mismatch between the sliding operation and the switching of the visual field picture of the game. Therefore, the difference of the visual field displacement caused by the buffering adjustment of the visual field for the quick sliding operation which is judged as the flinging operation can be compensated by the compensating adjustment information of the visual field, ensuring that the sliding operation of the player matches the actual switching of the visual field picture of the game.

In specific implementation, for the judgment of the quick sliding operation, if the sliding acceleration of the sliding operation is greater than or equal to the acceleration threshold, the starting time point corresponding to when the sliding acceleration of the sliding operation is greater than or equal to the acceleration threshold is obtained. Within the preset time from the starting time point, if the touch lifting of the sliding operation is not detected, then it is judged that the triggering behavior of the sliding operation is the quick movement of the visual field, and the operation type is a quick sliding operation. When the sliding operation for the visual field switching area is a quick sliding operation, the terminal can obtain the actual movement speed of the visual field corresponding to the sliding speed, as well as the buffering adjustment parameter corresponding to the sliding operation. Then, based on the actual movement speed of the visual field and the buffering adjustment parameter, the first displacement of the visual field of the sliding operation within the preset duration and the target duration corresponding to the first displacement are determined, and the second displacement of the visual field of the sliding operation within the target duration is determined. Then, the current visual field picture of the game is switched to the target visual field picture of the game in the graphical user interface based on the first displacement of the visual field and the second displacement of the visual field.

It should be noted that when the sliding acceleration of the sliding operation is greater than or equal to the acceleration threshold, the terminal can determine that the sliding operation is a quick sliding operation. There is a similar performance between the quick sliding operation and the flinging operation, both of which increase the acceleration to a higher value in a short period of time. However, the quick sliding operation does not end with a lifting action, but stagnates with movement. In this regard, when determining that the sliding operation belongs to the quick sliding operation, the terminal can first assume that it is a flinging operation, and calculate the corresponding first displacement of the visual field for buffering adjustment of switching of the visual field picture. However, due to this being a "judgment error", the actual sliding operation is a quick sliding operation, and buffering and compensating for the switching of the visual field picture is required. Therefore, in the terminal, buffering adjustment parameter is used to adjust the actual movement speed of the visual field, and the first movement speed of the visual field corresponding to the sliding operation within the preset duration is obtained. After determining the first displacement of the visual field of the sliding operation within the preset duration by adopting the preset duration and the first movement speed of the visual field, the actual displacement of the visual field of the sliding operation within the preset duration can be determined by adopting the preset duration and the actual movement speed of the visual field. The difference in the displacement of the visual field between the actual displacement of the visual field and the first displacement of the visual field is calculated. The difference in the displacement of the visual field can represent the displacement of the visual field reduced by the buffering adjustment of the first displacement of the visual field, which needs to be compensated again. The terminal can further obtain the compensating adjustment parameter corresponding to the sliding operation, and use the difference in the displacement of the visual field and the compensating adjustment parameter to calculate the target duration corresponding to the first displacement of the visual field, in order for the terminal to further determine the corresponding second displacement of the visual field within the target duration, and then compensate for the difference in the displacement of the visual field caused by the first displacement of the visual field through the second displacement of the visual field, thereby ensuring that the sliding operation of the player is consistent with the actual switching of the visual field picture of the game.

For the target duration, it can be determined based on the displacement of the visual field subjected to buffering adjustment within the preset duration and the preset compensating adjustment parameter. Since the buffering adjustment of the visual field picture of the game is performed within the preset duration, it is necessary to perform compensating adjustment for the visual field picture of the game within the target duration, in order to cancel the difference in the displacement of the visual field adjusted within the preset duration, thereby ensuring that the sliding operation of the player is consistent with the actual switching of the visual field picture of the game. Specifically, for the second displacement of the visual field, the terminal can obtain the compensating adjustment parameter corresponding to the sliding operation. Then, by using the compensating adjustment parameter and the actual movement speed of the visual field, the second movement speed of the visual field of the sliding operation within the target duration is determined. Then, by using the target duration and the second movement speed of the visual field, the second displacement of the visual field of the sliding operation within the target duration is determined, in order to compensate for the difference in the displacement of the visual field caused by the first displacement of the visual field through the second displacement of the visual field, thereby ensuring that the sliding operation of the player is consistent with the actual switching of the visual field picture of the game.

In another example, assuming that the acceleration threshold corresponding to the judgment condition for adjustment of the visual field is a', the preset duration is t1, the buffering adjustment parameter is c1, and the compensating adjustment parameter is c2, the terminal can obtain the sliding speed v and sliding acceleration a of the sliding operation after receiving the sliding operation for the visual field switching area. When $a \geq a'$, the starting time point that satisfies a' is used as the judgment point, and the time point t of the judgment point is obtained. If no touch lifting of the sliding operation is detected during the period from t to (t+t1), it is determined that the type of sliding operation is the quick sliding operation and the triggering behavior is the quick movement of the visual field picture. The switching of the visual field picture for the quick sliding operation can be divided by time, including t to (t+t1), (t+t1) to (t+t1+t2). t2 is the target duration, which can be adjusted according to the buffered displacement of the visual field during the period from t to (t+t1) and c2 value. Therefore, for the quick sliding operation, during the period from t to (t+t1), the terminal can determine the sliding operation within that time as a flinging operation and perform buffering adjustment for the switching of the visual field. Specifically, the actual movement speed Va of the visual field corresponding to the sliding speed v can be determined first (Va can represent the actual movement speed of the visual field picture without buffering adjustment for the switching of the visual field). Then, Va and the buffering adjustment parameter c1 are used to calculate the first movement speed V1 of the visual field, and V1 is multiplied by t1 to obtain the visual field displacement of the visual field picture of the game during the period from t to (t+t1). Then the terminal can switch the current visual field picture of the game to the target visual field picture of the game according to the first displacement of the visual field during the period from t to (t+t1).

During the period from (t+t1) to (t+t1+t2), due to the buffering adjustment during the period from t to (t+t1), the compensating adjustment of the visual field picture is required during this period, in order to compensate for the difference in the displacement of the visual field caused by buffering adjustment of the visual field picture during the period from t to (t+t1). Specifically, Va and t1 can be used to calculate the actual displacement of the visual field during the period from t to (t+t1), and the actual displacement of the visual field is subtracted from the first displacement of the visual field to obtain the difference in the displacement of the visual field during the buffering adjustment process. Then, the target duration t2 that needs to be compensated and adjusted is calculated by using the difference in the displacement of the visual field and c2. Then, the actual movement speed Va of the visual field between (t+t1) and (t+t1+t2) can be obtained, and the second movement speed V2 of the visual field can be calculated by using VA and the compensating adjustment parameter c2, and V2 is multiplied by t2 to obtain the second displacement of the visual field during the period from (t+t1) to (t+t1+t2), and the current visual field picture of the game is switched to the target visual field picture of the game according to the second displacement of the visual field during the period from (t+t1) to (t+t1+t2). Therefore, when the player inputs a quick sliding operation for the visual field switching area to quickly move the visual field picture, the terminal can first perform buffering adjustment due to the judgment of the flinging operation, Next, the buffering adjustment is compensated to ensure that the sliding operation of the player is consistent with the actual switching of the visual field picture of the game. In addition, if the terminal detects the touch lifting of the sliding operation within the preset duration from the starting point, it can stop switching the visual field picture and end the corresponding judgment process.

It should be noted that in the above process, the quick sliding operation of the player is divided into two stages: t to (t+t1) and (t+t1) to (t+t1+t2). During the stage from t to (t+t1), the buffering adjustment for the switching of the visual field is applied to the process corresponding to the flinging operation in the quick sliding operation process. During the stage from (t+t1) to (t+t1+t2), compensating adjustment is performed for the difference in the displacement of the visual field caused by the buffering adjustment for the quick sliding operation process, in order to compensate for the "judgment error" of the terminal. In practice, if the total duration corresponding to the two stages of t to (t+t1) and (t+t1) to (t+t1+t2) is exactly equal to the duration of the quick sliding operation, then the switching process of the visual field picture of the game can refer to the above process. If the total duration of both is less than the duration of the quick sliding operation, it can be assumed that the quick sliding duration of the player can be t3. The corresponding adjustment duration between t and (t+t1+t2) is not equal to t3 and is only a pail of the duration of the quick sliding operation. For the visual field switching during the period from (t+t1+t2) to t3, the terminal can calculate the displacement of the visual field during the period from (t+t1+t2) to t3 based on the time difference between the actual movement speed of the visual field and (t3−(t+t1+t2)), and switch the visual field picture of the game based on the displacement of the visual field. For the visual field switching for the two stages of t to (t+t1) and (t+t1) to (t+t1+t2), the above process can be referred to, and will not be repeated here.

It should be noted that the embodiments of the present disclosure include but are not limited to the above examples. It can be understood that under the guidance of the embodiments of the present disclosure, those skilled in the art can also set them according to actual needs, and the present disclosure is not limited to this.

In the embodiment of the present disclosure, the terminal can display the visual field picture and corresponding visual field switching area of the game through a graphical user interface. In the game, the terminal can determine, in response to receiving a sliding operation in the visual field switching area, the touch parameter corresponding to the sliding operation and the operation judgment conditions for the sliding operation. If the touch parameter meets the judgment condition for fling, it is determined that the sliding operation is a sliding operation. The corresponding buffering adjustment information of the visual field is determined, and then the buffering adjustment for the visual field switching is performed based on the buffering adjustment information of the visual field, and the game interactive operation corresponding to sliding operation is performed. If the touch parameter meets the judgment condition for the adjustment of the visual field, it is determined that the sliding operation is a sliding operation. The corresponding compensating adjustment information of the visual field is determined. Based on the compensating adjustment information of the visual field, compensating adjustment for the visual field switching is performed. Therefore, in the game, for the visual field switching area with composite functions, when the player controls the visual field switching area based on the sliding operation, the terminal can determine to which operation the sliding operation belongs based on the sliding parameter of the sliding operation. During the visual field switching process, the visual field is adjusted and corresponding game operations are performed according to the type of sliding operation, thereby effectively solving the problem of the visual field movement that is not subjectively expected by the player, and optimizing the flexibility of visual field switching.

In order to enable those skilled in the art to better understand the technical solution of the embodiments of the present disclosure, an example is provided below for illustrative explanation.

Figure 4:
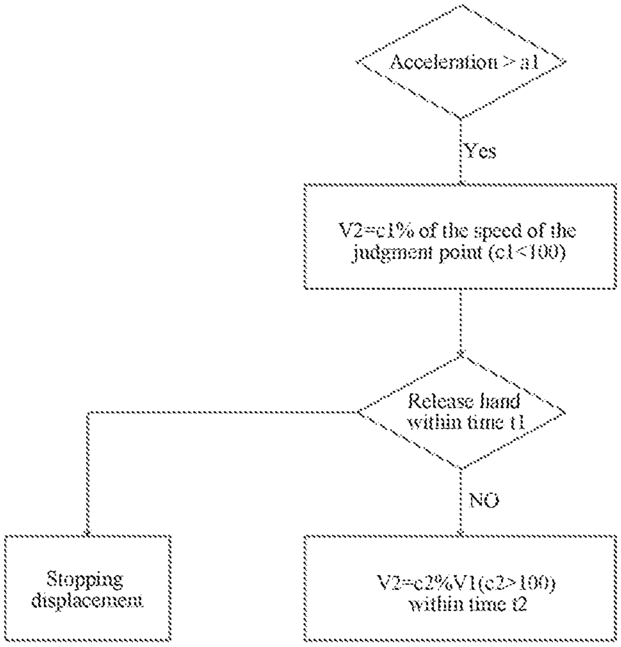
FIG. 4 is a schematic diagram of the fling judgment process provided in the embodiment of the present disclosure.

Referring to FIG. 4, a flowchart of the fling judgment provided in the embodiment of the present disclosure is shown. Assuming a' is the acceleration threshold for determining the flinging operation, c1 is the buffering adjustment parameter (which can be less than 100%), c2 is the compensating adjustment parameter (which can be greater than 100%), t1 is the time value for determining the flinging operation, t2 is the time value for compensating adjustment of the movement of the visual field picture (which can be adjusted based on the displacement of the visual field picture subjected buffering adjustment within time t1 and c2 value), Va can be the actual movement speed of the visual field, V1 can be the first movement speed of the visual field under buffering adjustment (which can be Va*c1), V2 can be the second movement speed of the visual field under compensating adjustment (which can be Va*c2). When the player performs a sliding operation in the visual field switching area, the terminal can monitor the sliding acceleration of the sliding operation in real time. If the sliding acceleration a is greater than or equal to a' the terminal obtains the time point t of the moment when the sliding acceleration a is greater than or equal to a', and detects whether the sliding operation has ended during the period from t to (t+t1).

If the touch lifting of the sliding operation is detected during the period from t to (t+t1), it is determined that the operation type of the sliding operation is a flinging operation, and the triggering behavior is a sliding operation. During the period from t to (t+t1), buffering adjustment of the visual field picture is performed, and the corresponding first displacement of the visual field can be t1*V1. During the process of switching the visual field picture of the game based on the first displacement of the visual field, corresponding interactive operations of the game can also be performed.

If the touch lifting of the sliding operation is not detected during the period from t to (t+t1), it is determined that the operation type of the sliding operation is a conventional sliding operation (such as quick sliding operation), and the triggering behavior is a sliding operation. The buffering adjustment of the visual field is performed during the period from t to (t+t1), and the compensating adjustment of the visual field is performed during the period from (t+t1) to (t+t1+t2), in order to compensate for the difference in the displacement of the visual field subjected to buffering adjustment. The corresponding first displacement of the visual field can be t1*V1, and the corresponding second displacement of the visual field can be t2*V2. The corresponding switching of the visual field picture of the game is performed between t to (t+t1+t2).

Figure 5:
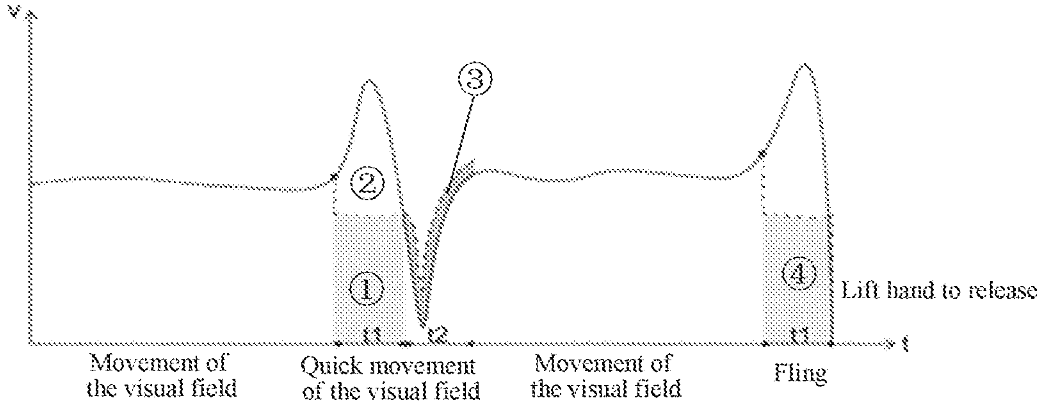
FIG. 5 is a schematic diagram of the V-T curve provided in the embodiment of the present disclosure.

Specifically, the V-T curve diagram for the above process can be referred to FIG. 5, which is a schematic diagram of the V-T curve provided in the embodiment of the present disclosure. The solid line can represent the actual movement speed of the visual field, and the dashed line can represent the movement speed of the visual field under adjustment. As shown in FIG. 5, during the process of quick movement of the visual field, it can be divided into t1 stage and t2 stage. The buffering adjustment is performed in the t1 stage, and the compensating adjustment is performed in the t2 stage for the buffering adjustment performed in the t1 stage. Specifically, region ① represents the first displacement of the visual field in the quick movement of the visual field in the t1 stage. Region ② represents the difference in the displacement of the visual field between the actual displacement of the visual field and the first visual field displacement in the t1 stage. Region ③ can be the second displacement of the visual field, which can be used for the visual field displacement compensation for the difference in the displacement of the visual field performed in stage t2, so that the terminal can first perform buffering adjustment due to the judgment of flinging operation, and then compensate for the buffering adjustment to ensure that the sliding operation of the player is consistent with the actual switching of the visual field picture of the game. In the flinging operation stage, region ④ can compensate displacement for the buffering of the movement of the visual field during the flinging operation stage. The re-determined first displacement of the visual field is used as the displacement of the visual field generated by the flinging operation, to achieve the buffering adjustment of the switching of the visual field picture, thereby reducing or avoiding the switching of the visual field that is not subjectively expected by the player caused by the flinging operation.

It should be noted that for the sake of simplicity in describing method embodiments, they are all expressed as a series of action combinations. However, those skilled in the art should be aware that the embodiments of the present disclosure are not limited by the order of the described actions, as according to the embodiments of the present disclosure, certain steps can be performed in other sequences or simultaneously. Secondly, those skilled in the art should also be aware that the embodiments described in the specification are all preferred embodiments, and the actions involved may not be necessary for the embodiments of the present disclosure.

Figure 6:
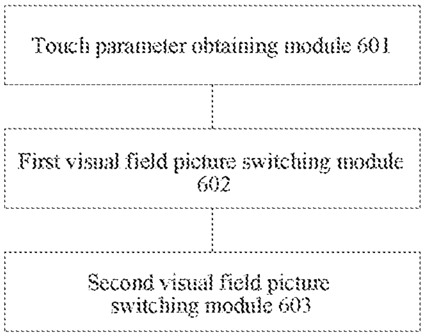
FIG. 6 is a structural block diagram of a device for switching pictures in game provided in the embodiment of the present disclosure.

Referring to FIG. 6, a structural block diagram of a device for switching pictures in game provided in the embodiment of the present disclosure is shown. A graphical user interface is provided through a preset terminal, and the displayed content in the graphical user interface at least includes a visual field picture of the game and a visual field switching area for the visual field picture of the game. Specifically, the following modules can be included:

A touch parameter obtaining module 601 is configured to obtain a touch parameter corresponding to a sliding operation in response to receiving the sliding operation in the visual field switching area.

A first visual field picture switching module 602 is configured to: determine the buffering adjustment information of the visual field corresponding to the sliding operation if the touch parameter meets the judgment condition for fling: performing the buffering adjustment of the switching of the visual field for the current visual field picture of the game based on the buffering adjustment information of the visual field, in order to display the target visual field picture of the game in the graphical user interface, and perform game interactive operations corresponding to the sliding operation.

A second visual field picture switching module 603 is configured to determine the compensating adjustment information of the visual field corresponding to the sliding operation if the touch parameter meets the judgment condition for the adjustment of the visual field, and perform compensating adjustment of the switching of the visual field for the current visual field picture of the game based on the compensating adjustment information of the visual field, in order to display the target visual field picture of the game in the graphical user interface.

In an optional embodiment, the touch parameter at least includes a sliding acceleration. The judgment condition for fling at least includes an acceleration threshold and a preset duration. The first visual field picture switching module 602 includes the following sub-modules.

A first starting time point obtaining sub-module is configured to obtain a starting time point corresponding to when the sliding acceleration of the sliding operation is greater than or equal to the acceleration threshold, if the sliding acceleration of the sliding operation is greater than or equal to the acceleration threshold.

A buffering adjustment information determining sub-module is configured to determine buffering adjustment information of the visual field corresponding to the sliding operation in response to a lifting operation of the sliding operation within the preset duration from the starting time point.

In an optional embodiment, the touch parameter at least includes a sliding speed, and the first visual field picture switching module 602 includes the following sub-modules.

A movement speed obtaining sub-module is configured to obtain an actual movement speed of the visual field corresponding to the sliding speed and the buffering adjustment parameter corresponding to the judgment condition for fling.

A first visual field displacement determining sub-module is configured to determine a first displacement of the visual field corresponding to the sliding operation based on the actual movement speed of the visual field and the buffering adjustment parameter.

A first visual field picture switching sub-module is configured to perform buffering adjustment of the switching of the visual field for the current visual field picture of the game according to the first displacement of the visual field to display the target visual field picture of the game in the graphical user interface.

In an optional embodiment, the touch parameter include an actual operation duration of the sliding operation, and the first visual field displacement determining sub-module is specifically configured to: perform buffering adjustment for the actual movement speed of the visual field by using the buffering adjustment parameter, and obtain a target movement speed of the visual field corresponding to the sliding operation; calculate the first displacement of the visual field corresponding to the sliding operation by using the preset duration or the actual operation duration and the target movement speed of the visual field; where the actual operation duration is a duration from the starting time point to a time point when responding to the lifting operation.

In an optional embodiment, the content displayed in the graphical user interface further includes several interactive controls, and the first visual field picture switching module 602 is specifically configured to determine a target interactive control corresponding to the sliding operation and perform the game interactive operation corresponding to the target interactive control.

In an optional embodiment, the touch parameter at least includes a sliding acceleration. The judgment condition for adjustment of the visual field at least includes an acceleration threshold and a preset duration. The second visual field picture switching module 603 includes the following sub-modules.

A second starting time point obtaining sub-module is configured to obtain a starting time point corresponding to when the sliding acceleration of the sliding operation is greater than or equal to the acceleration threshold, if the sliding acceleration of the sliding operation is greater than or equal to the acceleration threshold.

A sliding operation determining sub-module is configured to determine the compensating adjustment information of the visual field corresponding to the sliding operation if a touch lifting of the sliding operation is not detected within the preset duration from the starting time point.

In an optional embodiment, the touch parameter at least includes a sliding speed, and the second visual field picture switching module 603 includes the following sub-modules.

An adjustment parameter obtaining sub-module is configured to obtain the actual movement speed of the visual field corresponding to the sliding speed and the buffering adjustment parameter corresponding to the sliding operation.

A target duration determining sub-module is configured to determine the first displacement of the visual field of the sliding operation within the preset duration and the target duration corresponding to the first displacement of the visual field based on the actual movement speed of the visual field and the buffering adjustment parameter.

A second visual field displacement determining sub-module is configured to determine the second displacement of the visual field of the sliding operation within the target duration.

A visual field picture adjusting sub-module is configured to switch the current visual field picture of the game to the target visual field picture of the game in the graphical user interface based on the first displacement of the visual field and the second displacement of the visual field.

In an optional embodiment, the target duration determining sub-module is specifically configured to: adjust the actual movement speed of the visual field by using the buffering adjustment parameter, and obtain the first movement speed of the visual field corresponding to the sliding operation within the preset duration; determine the first displacement of the visual field of the sliding operation within the preset duration by using the preset duration and the first movement speed of the visual field; determine the actual displacement of the visual field of the sliding operation within the preset duration by using the preset duration and the actual movement speed of the visual field; calculate the difference in the displacement of the visual field between the actual displacement of the visual field and the first displacement of the visual field; obtain the compensating adjustment parameter corresponding to the sliding operation, and calculate the target duration corresponding to the first displacement of the visual field by using the difference in the displacement of the visual field and the compensating adjustment parameter.

In an optional embodiment, the second visual field displacement determining sub-module is specifically configured to: obtain the compensating adjustment parameter corresponding to the sliding operation; adjust the actual movement speed of the visual field by using the compensating adjustment parameter, and determine the second movement speed of the visual field of the sliding operation within the target duration; determine the second displacement of the visual field of the sliding operation within the target duration by using the target duration and the second movement speed of the visual field.

In an optional embodiment, the visual field switching area includes a visual field switching control, and the touch parameter obtaining module 601 is specifically configured to: determine, in response to the visual field switching control receiving the sliding operation, the touch parameter corresponding to the sliding operation and the operation judgment condition for the sliding operation.

For the device embodiment, due to its basic similarity with the method embodiment, the description is relatively simple. Please refer to the section of the method embodiment for relevant information.

Figure 7:
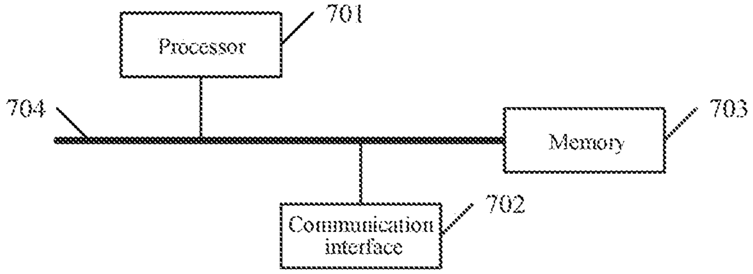
FIG. 7 is a block diagram of an electronic device provided in the embodiment of the present disclosure.

In addition, the embodiment of the present disclosure also provides an electronic device, as shown in FIG. 7, including a processor 701, a communication interface 702, a memory 703, and a communication bus 704. The processor 701, the communication interface 702, and the memory 703 communicate with each other through the communication bus 704.

The memory 703 is configured to store computer programs.

The processor 701 is configured to implements the following steps when executing programs stored on the memory 703: obtain a touch parameter corresponding to a sliding operation in response to receiving the sliding operation in the visual field switching area; determine the buffering adjustment information of the visual field corresponding to the sliding operation if the touch parameter meets the judgment condition for fling; performing the buffering adjustment of the switching of the visual field for the current visual field picture of the game based on the buffer adjustment information of the visual field, in order to display the target visual field picture of the game in the graphical user interface, and perform game interactive operations corresponding to the sliding operation; determine the compensating adjustment information of the visual field corresponding to the sliding operation if the touch parameter meets the judgment condition for the adjustment of the visual field, and perform compensating adjustment of the switching of the visual field for the current visual field picture of the game based on the compensating adjustment information of the visual field, in order to display the target visual field picture of the game in the graphical user interface.

In an optional embodiment, the touch parameter at least includes a sliding acceleration. The judgment condition for fling at least includes an acceleration threshold and a preset duration. Determining the buffer adjustment information of the visual field corresponding to the sliding operation if the touch parameter meets the judgment condition for fling, includes: if the sliding acceleration of the sliding operation is greater than or equal to the acceleration threshold, obtaining a starting time point corresponding to when the sliding acceleration of the sliding operation is greater than or equal to the acceleration threshold; determining the buffering adjustment information of visual field corresponding to the sliding operation in response to the lifting operation of the sliding operation within the preset duration from the starting time point.

In an optional embodiment, the touch parameter least includes a sliding speed. Determining the buffering adjustment information of the visual field corresponding to the sliding operation, includes: obtaining an actual movement speed of the visual field corresponding to the sliding speed, as well as the buffering adjustment parameter corresponding to the judgment condition for fling; determining a first displacement of the visual field corresponding to the sliding operation based on the actual movement speed of the visual field and the buffering adjustment parameter.

Performing the buffering adjustment of the switching of the visual field for the current visual field picture of the game based on the buffering adjustment information of the visual field, includes performing buffering adjustment of the switching of the visual field for the current visual field picture of the game according to the first displacement of the visual field, in order to display the target visual field picture of the game in the graphical user interface.

In an optional embodiment, the touch parameter include the actual operation duration of the sliding operation, and determining the first displacement of the visual field corresponding to the sliding operation based on the actual movement speed of the visual field and the buffering adjustment parameter, includes: performing the buffering adjustment for the actual movement speed of the visual field by using the buffering adjustment parameter, and obtaining a target movement speed of the visual field corresponding to the sliding operation; calculating the first displacement of the visual field corresponding to the sliding operation by using the preset duration or the actual operation duration and the target movement speed of the visual field; where the actual operation duration is a duration from the starting time point to a time point when responding to the lifting operation.

In an optional embodiment, the content displayed in the graphical user interface further includes several interactive controls. Performing the game interactive operation corresponding to the sliding operation includes: determining a target interactive control corresponding to the sliding operation and performing the game interactive operation corresponding to the target interactive control.

In an optional embodiment, the touch parameter at least includes the sliding acceleration, and the judgment condition for adjustment of the visual field at least includes an acceleration threshold and a preset duration. If the touch parameter meets the judgment condition for adjustment of the visual field, determining the compensating adjustment information of the visual field corresponding to the sliding operation, includes: if the sliding acceleration of the sliding operation is greater than or equal to the acceleration threshold, obtaining a starting time point corresponding to when the sliding acceleration of the sliding operation is greater than or equal to the acceleration threshold; if the touch lifting of the sliding operation is not detected within the preset duration from the starting time point, determining the compensating adjustment information of the visual field corresponding to the sliding operation.

In an optional embodiment, the touch parameter at least includes a sliding speed. Determining the compensating adjustment information of the visual field corresponding to the sliding operation, includes: obtaining the actual movement speed of the visual field corresponding to the sliding speed, as well as the buffering adjustment parameter corresponding to the sliding operation; determining the first displacement of the visual field of the sliding operation within the preset duration and the target duration corresponding to the first displacement of the visual field based on the actual movement speed of the visual field and the buffering adjustment parameter; determining the second displacement of the visual field of the sliding operation within the target duration.

Performing the compensating adjustment of the switching of the visual field for the current visual field picture of the game based on the compensating adjustment information of the visual field to display the target visual field picture of the game in the graphical user interface, includes: switching the current visual field picture of the game to the target visual field picture of the game in the graphical user interface based on the first displacement of the visual field and the second displacement of the visual field.

In an optional embodiment, determining the first displacement of the visual field of the sliding operation within the preset duration and the target duration corresponding to the first displacement of the visual field based on the actual movement speed of the visual field and the buffering adjustment parameter, includes: performing buffering adjustment for the actual movement speed of the visual field by using the buffering adjustment parameter, and obtaining the first movement speed of the visual field corresponding to the sliding operation within the preset duration; determining the first displacement of the visual field of the sliding operation within the preset duration by using the preset duration and the first movement speed of the visual field; determining the actual displacement of the visual field of the sliding operation within the preset duration by using the preset duration and the actual movement speed of the visual field; calculating the difference in the displacement of the visual field between the actual displacement of the visual field and the first displacement of the visual field; obtaining the compensating adjustment parameter corresponding to the sliding operation, and calculating the target duration corresponding to the first displacement of the visual field by using the difference in the displacement of the visual field and the compensating adjustment parameter.

In an optional embodiment, determining the second displacement of the visual field of the sliding operation within the target duration includes: adjusting the actual movement speed of the visual field by using the compensating adjustment parameter, and obtaining the second movement speed of the visual field of the sliding operation within the target duration; determining the second displacement of the visual field of the sliding operation within the target duration by using the target duration and the second movement speed of the visual field.

In an optional embodiment, the visual field switching area includes a visual field switching control, and determining, in response to receiving a sliding operation in the visual field switching area, the touch parameter corresponding to the sliding operation and the operation judgment conditions for the sliding operation, includes: determining, in response to the visual field switching control receiving a sliding operation, the touch parameter corresponding to the sliding operation and the operation judgment conditions for the sliding operation.

The specific implementation content of the method for switching pictures in game in this embodiment is also applicable to the implementation content of the method for switching pictures in game mentioned above, so it will not be elaborated here.

Through the above embodiments, the visual field picture of the game and the corresponding visual field switching area can be displayed through the graphical user interface. In the game, in response to receiving the sliding operation in the visual field switching area, the touch parameter corresponding to the sliding operation can be obtained. If the touch parameter meets the judgment condition for fling, the corresponding buffering adjustment information of the visual field is determined. Then, based on the buffering adjustment information of the visual field, the buffering adjustment of the switching of the visual field is performed, and the game interactive operation corresponding to the sliding operation is performed. If the touch parameter meets the judgment conditions for adjustment of the visual field, the corresponding compensating adjustment information of the visual field is determined, and the compensating adjustment of the switching of the visual field is performed according to the compensating adjustment information of the visual field. Therefore, in the game, for the visual field switching area with composite functions, when players control the visual field switching area based on sliding operations, which operation the sliding operation belongs to can be determined based on the sliding parameter of the sliding operation. During the visual field switching process, the visual field is adjusted and corresponding game operations are performed according to the type of sliding operation, thereby effectively solving the problem of the visual field movement that is not subjectively expected by the players and optimizing the flexibility of visual field switching.

The communication bus mentioned by the above terminals can be either a Peripheral Component Interconnect (PCI) bus or an Extended Industry Standard Architecture (EISA) bus. The communication bus can be classified into address bus, data bus, control bus, etc. For ease of representation, only one thick line is used in the figure, but it does not mean that there is only one bus or one type of bus.

The communication interface is used for communication between the aforementioned terminal and other devices.

The memory can include random access memory (RAM) or non-volatile memory, such as at least one disk storage. In some embodiments, the memory may also be at least one storage device located far away from the aforementioned processor.

The above-mentioned processor can be a general-purpose processor, including Central Processing Unit (CPU), Network Processor (NP), etc. It can also be a Digital Signal Processing (DSP), Application Specific Integrated Circuit (ASIC), Field Programmable Gate Array (FPGA), or other programmable logic devices, discrete gates or transistor logic devices, or discrete hardware components.

Figure 8:
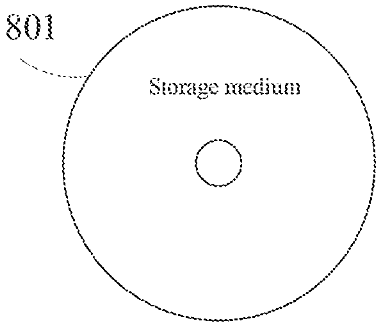
FIG. 8 is a schematic diagram of a computer-readable medium provided in the embodiment of the present disclosure.

As shown in FIG. 8, in another embodiment provided in the present disclosure, there is also provided a computer-readable storage medium 801, which stores instructions. When the instructions run on the computer, the computer performs the following steps: in response to receiving the sliding operation in the visual field switching area, obtaining the touch parameter corresponding to the sliding operation; if the touch parameter meets the judgment condition for fling, determining the buffering adjustment information of the visual field corresponding to the sliding operation, and performing buffering adjustment of the switching of the visual field for the current visual field picture of the game based on the buffering adjustment information of the visual field, to display the target visual field picture of the game in the graphical user interface, and performing the game interactive operation corresponding to the sliding operation; if the touch parameter meets the judgment condition for adjustment of the visual field, determining the compensating adjustment information of the visual field corresponding to the sliding operation, and performing compensating adjustment of the switching of the visual field for the current visual field picture of the game based on the compensating adjustment information of the visual field to display the target visual field picture of the game in the graphical user interface.

In an optional embodiment, the touch parameter at least includes a sliding acceleration, and the judgment condition for fling at least includes an acceleration threshold and a preset duration. If the touch parameter meets the judgment condition for fling, determining the buffering adjustment information of the visual field corresponding to the sliding operation, includes: if the sliding acceleration of the sliding operation is greater than or equal to the acceleration threshold, obtaining a starting time point corresponding to when the sliding acceleration of the sliding operation is greater than or equal to the acceleration threshold; determining the buffering adjustment information of the visual field corresponding to the sliding operation in response to the lifting operation of the sliding operation within the preset duration from the starting time point.

In an optional embodiment, the touch parameter at least includes a sliding speed. Determining the buffering adjustment information of the visual field corresponding to the sliding operation, includes: obtaining an actual movement speed of the visual field corresponding to the sliding speed and a buffering adjustment parameter corresponding to the judgment condition for fling; determining a first displacement of the visual field corresponding to the sliding operation based on the actual movement speed of the visual field and the buffering adjustment parameter.

Performing the buffering adjustment of the switching of the visual field for the current visual field picture of the game based on the buffering adjustment information of the visual field, includes: performing buffering adjustment of the switching of the visual field for the current visual field picture of the game according to the first displacement of the visual field, in order to display the target visual field picture of the ga me in the graphical user interface.

In an optional embodiment, the touch parameter includes the actual operation duration of the sliding operation, and determining the first displacement of the visual field corresponding to the sliding operation based on the actual movement speed of the visual field and the buffering adjustment parameter, includes: performing the buffering adjustment for the actual movement speed of the visual field by using the buffering adjustment parameter, and obtaining a target movement speed of the visual field corresponding to the sliding operation; calculating the first displacement of the visual field corresponding to the sliding operation by using the preset duration or the actual operation duration and the target movement speed of the visual field; where the actual operation duration is a duration from the starting time point to a time point when responding to the lifting operation.

In an optional embodiment, the content displayed in the graphical user interface further includes several interactive controls. Performing the game interactive operation corresponding to the sliding operation includes: determining a target interactive control corresponding to the sliding operation and performing the game interactive operation corresponding to the target interactive control.

In an optional embodiment, the touch parameter at least includes a sliding acceleration, and the judgment condition for adjustment of the visual field at least includes an acceleration threshold and a preset duration. If the touch parameter meets the judgment condition for adjustment of the visual field, determining the compensating adjustment information of the visual field corresponding to the sliding operation, includes: if the sliding acceleration of the sliding operation is greater than or equal to the acceleration threshold, obtaining a starting time point corresponding to when the sliding acceleration of the sliding operation is greater than or equal to the acceleration threshold; if the touch lifting of the sliding operation is not detected within the preset duration from the starting time point, determining the compensating adjustment information of the visual field corresponding to the sliding operation.

In an optional embodiment, the touch parameter at least includes a sliding speed. Determining the compensating adjustment information of the visual field corresponding to the sliding operation, includes: obtaining the actual movement speed of the visual field corresponding to the sliding speed and a buffering adjustment parameter corresponding to the sliding operation; determining the first displacement of the visual field of the sliding operation within the preset duration and the target duration corresponding to the first displacement of the visual field based on the actual movement speed of the visual field and the buffering adjustment parameter; determining the second displacement of the visual field of the sliding operation within the target duration.

Performing the compensating adjustment of the switching of the visual field for the current visual field picture of the game based on the compensating adjustment information of the visual field to display the target visual field picture of the game in the graphical user interface, includes: switching the current visual field picture of the game to the target visual field picture of the game in the graphical user interface based on the first displacement of the visual field and the second displacement of the visual field.

In an optional embodiment, determining the first displacement of the visual field of the sliding operation within the preset duration and the target duration corresponding to the first displacement of the visual field based on the actual movement speed of the visual field and the buffering adjustment parameter, includes: performing buffering adjustment for the actual movement speed of the visual field by using the buffering adjustment parameter, and obtaining the first movement speed of the visual field corresponding to the sliding operation within the preset duration; determining the first displacement of the visual field of the sliding operation within the preset duration by using the preset duration and the first movement speed of the visual field; determining the actual displacement of the visual field of the sliding operation within the preset duration by using the preset duration and the actual movement speed of the visual field; calculating the difference in the displacement of the visual field between the actual displacement of the visual field and the first displacement of the visual field; obtaining the compensating adjustment parameter corresponding to the sliding operation, and calculating the target duration corresponding to the first displacement of the visual field by using the difference in the displacement of the visual field and the compensating adjustment parameter.

In an optional embodiment, determining the second displacement of the visual field of the sliding operation within the target duration includes: adjusting the actual movement speed of the visual field by using the compensating adjustment parameter, and obtaining the second movement speed of the visual field of the sliding operation within the target duration; determining the second displacement of the visual field of the sliding operation within the target duration by using the target duration and the second movement speed of the visual field.

In an optional embodiment, the visual field switching area includes a visual field switching control, and determining, in response to receiving a sliding operation in the visual field switching area, the touch parameter corresponding to the sliding operation and the operation judgment conditions for the sliding operation, includes: determining, in response to the visual field switching control receiving a sliding operation, the touch parameter corresponding to the sliding operation and the operation judgment condition for the sliding operation.

The specific implementation content of the method for switching pictures in game in this embodiment is also applicable to the implementation content of the method for switching pictures in game mentioned above, so it will not be elaborated here.

Through the above embodiments, the visual field picture of the game and corresponding visual field switching area can be displayed through the graphical user interface. In the game, in response to receiving the sliding operation in the visual field switching area, the touch parameter corresponding to the sliding operation can be obtained. If the touch parameter meets the judgment condition for fling, the corresponding buffering adjustment information of the visual field is determined. Then, based on the buffering adjustment information of the visual field, the buffering adjustment of the switching of the visual field is performed, and the game interactive operation corresponding to the sliding operation is performed. If the touch parameter meets the judgment conditions for adjustment of the visual field, the corresponding compensating adjustment information of the visual field is determined, and the compensating adjustment of the switching of the visual field is performed according to the compensating adjustment information of the visual field. Therefore, in the game, for the visual field switching area with composite functions, when players control the visual field switching area based on sliding operations, which operation the sliding operation belongs to can be determined based on the sliding parameter of the sliding operation. During the visual field switching process, the visual field can be adjusted and corresponding game operations are performed according to the type of sliding operation, thereby effectively solving the problem of the visual field movement that is not subjectively expected by the players and optimizing the flexibility of visual field switching.

In another embodiment provided by the present disclosure, a computer program product including instructions is also provided, which, when running on a computer, causes the computer to execute the method for switching pictures in game as described in the above embodiment.

In the above embodiments, it can be fully or partially implemented through software, hardware, firmware, or any combination thereof. When implemented using software, it can be fully or partially implemented in the form of computer program products. The computer program product includes one or more computer instructions. When loading and executing computer program instructions on a computer, all or part of the processes or functions described in the embodiments of the present disclosure are generated. The computer can be a general-purpose computer, a specialized computer, a computer network, or other programmable devices. The computer instructions can be stored in a computer-readable storage medium or transmitted from one computer-readable storage medium to another. For example, the computer instructions can be transmitted from a website, a computer, a server or data center to another website site, computer, server or data center through wired (such as coaxial cable, fiber optic, digital user line (DSL)) or wireless (such as infrared, wireless, microwave, etc.) methods. The computer-readable storage medium can be any available medium that the computer can access, or a data storage device such as a server, a data center, etc. that integrates one or more available media. The available media can be magnetic media (such as floppy disks, hard drives, magnetic tapes), optical media (such as DVDs), or semiconductor media (such as solid state hard drives (SSDs)), etc.

The embodiments of the present disclosure provide a method for switching pictures in a game, wherein a graphical user interface is provided through a preset terminal, content displayed in the graphical user interface at least includes a visual field picture of the game and a visual field switching area for the visual field picture of the game, and the method includes: obtaining, in response to receiving a sliding operation in the visual field switching area, a touch parameter corresponding to the sliding operation; if the touch parameter meets a judgment condition for fling, determining buffering adjustment information of visual field corresponding to the sliding operation, performing buffering adjustment of switching of the visual field for a current visual field picture of the game based on the buffering adjustment information of the visual field to display a target visual field picture of the game in the graphical user interface, and performing a game interactive operation corresponding to the sliding operation; if the touch parameter meets a judgment condition for adjustment of the visual field, determining compensating adjustment information of the visual field corresponding to the sliding operation, and performing compensating adjustment of switching of the visual field for the current visual field picture of the game based on the compensating adjustment information of the visual field to display the target visual field picture of the game in the graphical user interface.

In some embodiments, the touch parameter at least includes a sliding acceleration, the judgment condition for fling at least includes an acceleration threshold and a preset duration, and if the touch parameter meets the judgment condition for fling, determining the buffering adjustment information of the visual field corresponding to the sliding operation, includes: if the sliding acceleration of the sliding operation is greater than or equal to the acceleration threshold, obtaining a starting time point corresponding to when the sliding acceleration of the sliding operation is greater than or equal to the acceleration threshold; determining the buffering adjustment information of the visual field corresponding to the sliding operation in response to a lifting operation of the sliding operation within the preset duration from the starting time point.

In some embodiments, the touch parameter at least includes a sliding speed, and determining the buffering adjustment information of the visual field corresponding to the sliding operation, includes obtaining an actual movement speed of the visual field corresponding to the sliding speed and a buffering adjustment parameter corresponding to the judgment condition for fling; determining a first displacement of the visual field corresponding to the sliding operation based on the actual movement speed of the visual field and the buffering adjustment parameter; where performing the buffering adjustment of the switching of the visual field for the current visual field picture of the game based on the buffering adjustment information of the visual field, includes: performing the buffering adjustment of the switching of the visual field for the current visual field picture of the game according to the first displacement of the visual field to display the target visual field picture of the game in the graphical user interface.

In some embodiments, the touch parameter includes an actual operation duration of the sliding operation, and determining the first displacement of the visual field corresponding to the sliding operation based on the actual movement speed of the visual field and the buffering adjustment parameter, includes: performing buffering adjustment for the actual movement speed of the visual field by using the buffering adjustment parameter, and obtaining a target movement speed of the visual field corresponding to the sliding operation; calculating the first displacement of the visual field corresponding to the sliding operation by using the preset duration or the actual operation duration and the target movement speed of the visual field; wherein the actual operation duration is a duration from the starting time point to a time point when responding to the lifting operation.

In some embodiments, the content displayed in the graphical user interface further includes several interactive controls, and performing the game interactive operation corresponding to the sliding operation includes: determining a target interactive control corresponding to the sliding operation and performing the game interactive operation corresponding to the target interactive control.

In some embodiments, the touch parameter at least includes a sliding acceleration, the judgment condition for adjustment of the visual field at least includes an acceleration threshold and a preset duration, and if the touch parameter meets the judgment condition for adjustment of the visual field, determining the compensating adjustment information of the visual field corresponding to the sliding operation includes if the sliding acceleration of the sliding operation is greater than or equal to the acceleration threshold, obtaining a starting time point corresponding to when the sliding acceleration of the sliding operation is greater than or equal to the acceleration threshold; if a touch lifting of the sliding operation is not detected within the preset duration from the starting time point, determining the compensating adjustment information of the visual field corresponding to the sliding operation.

In some embodiments, the touch parameter at least includes a sliding speed, and determining the compensating adjustment information of the visual field corresponding to the sliding operation, includes: obtaining an actual movement speed of the visual field corresponding to the sliding speed and a buffering adjustment parameter corresponding to the sliding operation; determining a first displacement of the visual field of the sliding operation within the preset duration and a target duration corresponding to the first displacement of the visual field based on the actual movement speed of the visual field and the buffering adjustment parameter; determining a second displacement of the visual field of the sliding operation within the target duration; wherein performing the compensating adjustment of the switching of the visual field for the current visual field picture of the game based on the compensating adjustment information of the visual field to display the target visual field picture of the game in the graphical user interface, includes: switching the current visual field picture of the game to the target visual field picture of the game in the graphical user interface based on the first displacement of the visual field and the second displacement of the visual field.

In some embodiments, determining the first displacement of the visual field of the sliding operation within the preset duration and the target duration corresponding to the first displacement of the visual field based on the actual movement speed of the visual field and the buffering adjustment parameter, includes: adjusting the actual movement speed of the visual field by using the buffering adjustment parameter, and obtaining a first movement speed of the visual field corresponding to the sliding operation within the preset duration; determining the first displacement of the visual field of the sliding operation within the preset duration by using the preset duration and the first movement speed of the visual field; determining an actual displacement of the visual field of the sliding operation within the preset duration by using the preset duration and the actual movement speed of the visual field; calculating a difference in displacement of the visual field between the actual displacement of the visual field and the first displacement of the visual field; obtaining a compensating adjustment parameter corresponding to the sliding operation, and calculating the target duration corresponding to the first displacement of the visual field by using the difference in the displacement of visual field and the compensating adjustment parameter.

In some embodiments, determining the second displacement of the visual field of the sliding operation within the target duration, includes: adjusting the actual movement speed of the visual field by using the compensating adjustment parameter, and obtaining a second movement speed of the visual field of the sliding operation within the target duration; determining the second displacement of the visual field of the sliding operation within the target duration by using the target duration and the second movement speed of the visual field.

In some embodiments, the visual field switching area includes a visual field switching control, and determining, in response to receiving the sliding operation in the visual field switching area, the touch parameter corresponding to the sliding operation and the operation judgment condition for the sliding operation, includes: determining, in response to the visual field switching control receiving the sliding operation, the touch parameter corresponding to the sliding operation and the operation judgment condition for the sliding operation.

The embodiments of the present disclosure provide a device for switching pictures in a game, where a graphical user interface is provided through a preset terminal, content displayed in the graphical user interface at least includes a visual field picture of the game and a visual field switching area for the visual field picture of the game, and the device includes: a touch parameter obtaining module configured to obtain, in response to receiving a sliding operation in the visual field switching area, a touch parameter corresponding to the sliding operation; a first visual field picture switching module configured to determine buffering adjustment information of visual field corresponding to the sliding operation if the touch parameter meets the judgment condition for fling, perform buffering adjustment of switching of the visual field for a current visual field picture of the game based on the buffer adjustment information of the visual field to display a target visual field picture of the game in the graphical user interface, and perform a game interactive operation corresponding to the sliding operation; a second visual field picture switching module configured to determine compensating adjustment information of the visual field corresponding to the sliding operation if the touch parameter meets a judgment condition for adjustment of the visual field, and perform compensating adjustment of switching of the visual field for the current visual field picture of the game based on the compensating adjustment information of the visual field to display the target visual field picture of the game in the graphical user interface.

In some embodiments, the touch parameter at least includes a sliding acceleration, the judgment condition for fling at least includes an acceleration threshold and a preset duration, and the first visual field picture switching module includes a first starting time point obtaining sub-module configured to obtain a starting time point corresponding to when the sliding acceleration of the sliding operation is greater than or equal to the acceleration threshold, if the sliding acceleration of the sliding operation is greater than or equal to the acceleration threshold; a buffering adjustment information determining sub-module configured to determine buffering adjustment information of the visual field corresponding to the sliding operation in response to a lifting operation of the sliding operation within the preset duration from the starting time point.

In some embodiments, the touch parameter at least includes a sliding speed, and the first visual field picture switching module includes a movement speed obtaining sub-module configured to obtain an actual movement speed of the visual field corresponding to the sliding speed and the buffering adjustment parameter corresponding to the judgment condition for fling; a first visual field displacement determining sub-module configured to determine a first displacement of the visual field corresponding to the sliding operation based on the actual movement speed of the visual field and the buffering adjustment parameter; a first visual field picture switching sub-module configured to perform buffering adjustment of the switching of the visual field for the current visual field picture of the game according to the first displacement of the visual field to display the target visual field picture of the game in the graphical user interface.

In some embodiments, the touch parameter include an actual operation duration of the sliding operation, and the first visual field displacement determining sub-module is specifically configured to: perform buffering adjustment for the actual movement speed of the visual field by using the buffering adjustment parameter, and obtain a target movement speed of the visual field corresponding to the sliding operation; calculate the first displacement of the visual field corresponding to the sliding operation by using the preset duration or the actual operation duration and the target movement speed of the visual field; where the actual operation duration is a duration from the starting time point to a time point when responding to the lifting operation.

In some embodiments, the content displayed in the graphical user interface further includes several interactive controls, and the first visual field picture switching module is specifically configured to determine a target interactive control corresponding to the sliding operation and perform the game interactive operation corresponding to the target interactive control.

In some embodiments, the touch parameter at least includes a sliding acceleration, the judgment condition for adjustment of the visual field at least includes an acceleration threshold and a preset duration, and the second visual field picture switching module includes a second starting time point obtaining sub-module configured to obtain a starting time point corresponding to when the sliding acceleration of the sliding operation is greater than or equal to the acceleration threshold, if the sliding acceleration of the sliding operation is greater than or equal to the acceleration threshold; a sliding operation determining sub-module configured to determine the compensating adjustment information of the visual field corresponding to the sliding operation if a touch lifting of the sliding operation is not detected within the preset duration from the starting time point.

In some embodiments, the touch parameter at least includes a sliding speed, and the second visual field picture switching module includes an adjustment parameter obtaining sub-module configured to obtain the actual movement speed of the visual field corresponding to the sliding speed and the buffering adjustment parameter corresponding to the sliding operation; a target duration determining sub-module configured to determine the first displacement of the visual field of the sliding operation within the preset duration and the target duration corresponding to the first displacement of the visual field based on the actual movement speed of the visual field and the buffering adjustment parameter; a second visual field displacement determining sub-module configured to determine the second displacement of the visual field of the sliding operation within the target duration; a visual field picture adjusting sub-module configured to switch the current visual field picture of the game to the target visual field picture of the game in the graphical user interface based on the first displacement of the visual field and the second displacement of the visual field.

In some embodiments, the target duration determining sub-module is specifically configured to: adjust the actual movement speed of the visual field by using the buffering adjustment parameter, and obtain the first movement speed of the visual field corresponding to the sliding operation within the preset duration; determine the first displacement of the visual field of the sliding operation within the preset duration by using the preset duration and the first movement speed of the visual field; determine the actual displacement of the visual field of the sliding operation within the preset duration by using the preset duration and the actual movement speed of the visual field; calculate the difference in the displacement of the visual field between the actual displacement of the visual field and the first displacement of the visual field; obtain the compensating adjustment parameter corresponding to the sliding operation, and calculate the target duration corresponding to the first displacement of the visual field by using the difference in the displacement of the visual field and the compensating adjustment parameter.

In some embodiments, the second visual field displacement determining sub-module is specifically configured to: obtain the compensating adjustment parameter corresponding to the sliding operation; adjust the actual movement speed of the visual field by using the compensating adjustment parameter, and determine the second movement speed of the visual field of the sliding operation within the target duration; determine the second displacement of the visual field of the sliding operation within the target duration by using the target duration and the second movement speed of the visual field.

In some embodiments, the visual field switching area includes a visual field switching control, and the touch parameter obtaining module is specifically configured to: determine, in response to the visual field switching control receiving the sliding operation, the touch parameter corresponding to the sliding operation and the operation judgment condition for the sliding operation.

The embodiments of the present disclosure also provide an electronic device including a processor, a communication interface, a memory, and a communication bus, wherein the processor, the communication interface, and the memory communicate with each other through the communication bus; the memory is configured to store computer programs; the processor is configured to implement the method described above when executing programs stored in the memory.

The embodiments of the present disclosure also provide a computer-readable storage medium storing instructions that, when executed by one or more processors, cause the processors to execute the method described above.

It should be noted that in this article, relational terms such as first and second are only used to distinguish one entity or operation from another entity or operation, and do not necessarily require or imply any actual relationship or order between these entities or operations. Moreover, the terms "including", "containing", or any other variation thereof are intended to encompass non-exclusive inclusion, such that a process, a method, an item, or a device that includes a series of elements not only includes those elements, but also includes other elements that are not explicitly listed, or also includes elements inherent to such process, method, item, or device. Without further limitations, an element limited by the statement "including a/an . . . " do not exclude the existence of other identical elements in the process, method, item, or device that includes the element.

The various embodiments in the specification are described in relevant ways, and the same and similar parts between the respective embodiments can be referred to each other. Each embodiment focuses on the differences from other embodiments. Especially for system embodiments, since they are basically similar to method embodiments, the description is relatively simple. Please refer to the section on method embodiments for relevant information.

The above is only a preferred embodiment of the present disclosure and is not intended to limit the scope of protection of the disclosure. Any modifications, equivalent replacements, improvements, etc. made within the spirit and principles of this disclosure are included within the scope of protection of the disclosure.

What is claimed is:

1. A method for switching pictures in a game, comprising:

obtaining, in response to receiving a sliding operation in a visual field switching area, a touch parameter corresponding to the sliding operation, wherein a graphical user interface is provided through a preset terminal, content displayed in the graphical user interface comprises a visual field picture of the game and the visual field switching area for the visual field picture of the game;

in response to determining that the touch parameter meets a judgment condition for fling, determining buffering adjustment information of the visual field corresponding to the sliding operation, performing buffering adjustment of switching of the visual field for a current visual field picture of the game based on the buffering adjustment information of the visual field to display a target visual field picture of the game in the graphical user interface, and performing a game interactive operation corresponding to the sliding operation; and in response to determining that the touch parameter meets a judgment condition for adjustment of the visual field, determining compensating adjustment information of the visual field corresponding to the sliding operation, and performing compensating adjustment of switching of the visual field for the current visual field picture of the game based on the compensating adjustment information of the visual field to display the target visual field picture of the game in the graphical user interface.

2. The method according to claim 1, wherein the touch parameter comprises a sliding acceleration, the judgment condition for fling comprises an acceleration threshold and a preset duration, and wherein in response to determining that the touch parameter meets the judgment condition for fling, determining the buffering adjustment information of the visual field corresponding to the sliding operation comprises:

in response to determining that the sliding acceleration of the sliding operation is greater than or equal to the acceleration threshold, obtaining a starting time point corresponding to when the sliding acceleration of the sliding operation is greater than or equal to the acceleration threshold; and determining the buffering adjustment information of the visual field corresponding to the sliding operation in response to a lifting operation of the sliding operation within the preset duration from the starting time point.

3. The method according to claim 2, wherein the touch parameter comprises a sliding speed, and wherein determining the buffering adjustment information of the visual field corresponding to the sliding operation comprises:

obtaining an actual movement speed of the visual field corresponding to the sliding speed and a buffering adjustment parameter corresponding to the judgment condition for fling; and determining a first displacement of the visual field corresponding to the sliding operation based on the actual movement speed of the visual field and the buffering adjustment parameter; and wherein performing the buffering adjustment of the switching of the visual field for the current visual field picture of the game based on the buffering adjustment information of the visual field comprises:

performing the buffering adjustment of the switching of the visual field for the current visual field picture of the game according to the first displacement of the visual field to display the target visual field picture of the game in the graphical user interface.

4. The method according to claim 3, wherein the touch parameter comprises an actual operation duration of the sliding operation, and wherein determining the first displacement of the visual field corresponding to the sliding operation based on the actual movement speed of the visual field and the buffering adjustment parameter comprises:

performing buffering adjustment for the actual movement speed of the visual field by using the buffering adjustment parameter, and obtaining a target movement speed of the visual field corresponding to the sliding operation; and calculating the first displacement of the visual field corresponding to the sliding operation by using the preset duration or the actual operation duration and the target movement speed of the visual field;

wherein the actual operation duration is a duration from the starting time point to a time point when responding to the lifting operation.

5. The method according to claim 1, wherein the content displayed in the graphical user interface further comprises several interactive controls, and wherein performing the game interactive operation corresponding to the sliding operation comprises:

determining a target interactive control corresponding to the sliding operation and performing the game interactive operation corresponding to the target interactive control.

6. The method according to claim 1, wherein the touch parameter comprises a sliding acceleration, the judgment condition for adjustment of the visual field comprises an acceleration threshold and a preset duration, and wherein in response to determining that the touch parameter meets the judgment condition for adjustment of the visual field, determining the compensating adjustment information of the visual field corresponding to the sliding operation comprises:

in response to determining that the sliding acceleration of the sliding operation is greater than or equal to the acceleration threshold, obtaining a starting time point corresponding to when the sliding acceleration of the sliding operation is greater than or equal to the acceleration threshold; and in response to determining that a touch lifting of the sliding operation is not detected within the preset duration from the starting time point, determining the compensating adjustment information of the visual field corresponding to the sliding operation.

7. The method according to claim 6, wherein the touch parameter comprises a sliding speed, and wherein determining the compensating adjustment information of the visual field corresponding to the sliding operation comprises:

obtaining an actual movement speed of the visual field corresponding to the sliding speed and a buffering adjustment parameter corresponding to the sliding operation;

determining a first displacement of the visual field of the sliding operation within the preset duration and a target duration corresponding to the first displacement of the visual field based on the actual movement speed of the visual field and the buffering adjustment parameter; and determining a second displacement of the visual field of the sliding operation within the target duration; and wherein performing the compensating adjustment of the switching of the visual field for the current visual field picture of the game based on the compensating adjustment information of the visual field to display the target visual field picture of the game in the graphical user interface comprises:

switching the current visual field picture of the game to the target visual field picture of the game in the graphical user interface based on the first displacement of the visual field and the second displacement of the visual field.

8. The method according to claim 7, wherein determining the first displacement of the visual field of the sliding operation within the preset duration and the target duration corresponding to the first displacement of the visual field based on the actual movement speed of the visual field and the buffering adjustment parameter comprises:

adjusting the actual movement speed of the visual field by using the buffering adjustment parameter, and obtaining a first movement speed of the visual field corresponding to the sliding operation within the preset duration;

determining the first displacement of the visual field of the sliding operation within the preset duration by using the preset duration and the first movement speed of the visual field;

determining an actual displacement of the visual field of the sliding operation within the preset duration by using the preset duration and the actual movement speed of the visual field;

calculating a difference in displacement of the visual field between the actual displacement of the visual field and the first displacement of the visual field; and obtaining a compensating adjustment parameter corresponding to the sliding operation, and calculating the target duration corresponding to the first displacement of the visual field by using the difference in the displacement of visual field and the compensating adjustment parameter.

9. The method according to claim 8, wherein determining the second displacement of the visual field of the sliding operation within the target duration, comprises:

adjusting the actual movement speed of the visual field by using the compensating adjustment parameter, and obtaining a second movement speed of the visual field of the sliding operation within the target duration; and determining the second displacement of the visual field of the sliding operation within the target duration by using the target duration and the second movement speed of the visual field.

10. The method according to claim 7, wherein switching the current visual field picture of the game to the target visual field picture of the game in the graphical user interface based on the first displacement of the visual field and the second displacement of the visual field comprises:

during the period from t to (t+t1), switching the current visual field picture of the game to a first visual field picture of the game by performing the buffering adjustment of the switching of the visual field for the current visual field picture of the game based on the first displacement of the visual field; and during the period of (t+t1) to (t+t1+t2), switching the first visual field picture of the game to the target visual field picture of the game by performing the compensating adjustment of the switching of the visual field for the first visual field picture of the game based on the second displacement of the visual field, wherein t is the starting time point, t1 represents the preset duration, and t2 represents the target duration.

11. The method according to claim 1, wherein the visual field switching area comprises a visual field switching control, and wherein determining, in response to receiving the sliding operation in the visual field switching area, the touch parameter corresponding to the sliding operation and an operation judgment condition for the sliding operation comprises:

determining, in response to the visual field switching control receiving the sliding operation, the touch parameter corresponding to the sliding operation and the operation judgment condition for the sliding operation.

12. The method according to claim 1, wherein the buffering adjustment information of the visual field is configured for reducing a movement of the visual field picture during the sliding operation of the terminal.

13. The method according to claim 1, wherein the compensating adjustment information of the visual field is configured for compensating for a difference of visual field displacement caused by the buffering adjustment of the visual field for the sliding operation, wherein the sliding operation is a flinging operation.

14. The method according to claim 1, wherein in response to determining that the touch parameter meets the judgment condition for fling, determining the sliding operation corresponds to a sliding operation with a composite function control, wherein the sliding operation with the composite function control comprises the sliding operation and a game function triggering operation.

15. An electronic device comprising a processor, a communication interface, a memory, and a communication bus, wherein the processor, the communication interface, and the memory communicate with each other through the communication bus;

the memory is configured to store computer programs;

the processor is configured to implement the following steps when executing programs stored in the memory:

obtaining, in response to receiving a sliding operation in a visual field switching area, a touch parameter corresponding to the sliding operation, wherein a graphical user interface is provided through a preset terminal, content displayed in the graphical user interface comprises a visual field picture of a game and the visual field switching area for the visual field picture of the game;

in response to determining that the touch parameter meets a judgment condition for fling, determining buffering adjustment information of the visual field corresponding to the sliding operation, performing buffering adjustment of switching of the visual field for a current visual field picture of the game based on the buffering adjustment information of the visual field to display a target visual field picture of the game in the graphical user interface, and performing a game interactive operation corresponding to the sliding operation; and in response to determining that the touch parameter meets a judgment condition for adjustment of the visual field, determining compensating adjustment information of the visual field corresponding to the sliding operation, and performing compensating adjustment of switching of the visual field for the current visual field picture of the game based on the compensating adjustment information of the visual field to display the target visual field picture of the game in the graphical user interface.

16. The device according to claim 15, wherein the touch parameter comprises a sliding acceleration, the judgment condition for fling comprises an acceleration threshold and a preset duration, and wherein in response to determining that the touch parameter meets the judgment condition for fling, determining the buffering adjustment information of the visual field corresponding to the sliding operation, comprises:

in response to determining that the sliding acceleration of the sliding operation is greater than or equal to the acceleration threshold, obtaining a starting time point corresponding to when the sliding acceleration of the sliding operation is greater than or equal to the acceleration threshold; and determining the buffering adjustment information of the visual field corresponding to the sliding operation in response to a lifting operation of the sliding operation within the preset duration from the starting time point.

17. The device according to claim 16, wherein the touch parameter comprises a sliding speed, and wherein determining the buffering adjustment information of the visual field corresponding to the sliding operation comprises obtaining an actual movement speed of the visual field corresponding to the sliding speed and a buffering adjustment parameter corresponding to the judgment condition for fling; and determining a first displacement of the visual field corresponding to the sliding operation based on the actual movement speed of the visual field and the buffering adjustment parameter; and wherein performing the buffering adjustment of the switching of the visual field for the current visual field picture of the game based on the buffering adjustment information of the visual field comprises:

performing the buffering adjustment of the switching of the visual field for the current visual field picture of the game according to the first displacement of the visual field to display the target visual field picture of the game in the graphical user interface.

18. A non-transitory computer-readable storage medium storing instructions that, when executed by one or more processors, cause the processors to execute the following steps:

obtaining, in response to receiving a sliding operation in a visual field switching area, a touch parameter corresponding to the sliding operation, wherein a graphical user interface is provided through a preset terminal, content displayed in the graphical user interface comprises a visual field picture of a game and the visual field switching area for the visual field picture of the game;

in response to determining that the touch parameter meets a judgment condition for fling, determining buffering adjustment information of the visual field corresponding to the sliding operation, performing buffering adjustment of switching of the visual field for a current visual field picture of the game based on the buffering adjustment information of the visual field to display a target visual field picture of the game in the graphical user interface, and performing a game interactive operation corresponding to the sliding operation; and in response to determining that the touch parameter meets a judgment condition for adjustment of the visual field, determining compensating adjustment information of the visual field corresponding to the sliding operation, and performing compensating adjustment of switching of the visual field for the current visual field picture of the game based on the compensating adjustment information of the visual field to display the target visual field picture of the game in the graphical user interface.

19. The non-transitory computer-readable storage medium according to claim 18, wherein the touch parameter comprises a sliding acceleration, the judgment condition for fling comprises an acceleration threshold and a preset duration, and wherein in response to determining that the touch parameter meets the judgment condition for fling, determining the buffering adjustment information of the visual field corresponding to the sliding operation, comprises:

in response to determining that the sliding acceleration of the sliding operation is greater than or equal to the acceleration threshold, obtaining a starting time point corresponding to when the sliding acceleration of the sliding operation is greater than or equal to the acceleration threshold; and determining the buffering adjustment information of the visual field corresponding to the sliding operation in response to a lifting operation of the sliding operation within the preset duration from the starting time point.

20. The non-transitory computer-readable storage medium according to claim 19, wherein the touch parameter comprises a sliding speed, and wherein determining the buffering adjustment information of the visual field corresponding to the sliding operation comprises obtaining an actual movement speed of the visual field corresponding to the sliding speed and a buffering adjustment parameter corresponding to the judgment condition for fling; and determining a first displacement of the visual field corresponding to the sliding operation based on the actual movement speed of the visual field and the buffering adjustment parameter; and wherein performing the buffering adjustment of the switching of the visual field for the current visual field picture of the game based on the buffering adjustment information of the visual field, comprises:

performing the buffering adjustment of the switching of the visual field for the current visual field picture of the game according to the first displacement of the visual field to display the target visual field picture of the game in the graphical user interface.

* * * * *